US010082015B2

(12) United States Patent
Williams et al.

(10) Patent No.: US 10,082,015 B2
(45) Date of Patent: Sep. 25, 2018

(54) APPARATUS FOR MEASURING A TUBULAR STRING AS IT IS LOWERED INTO A BOREHOLE AND METHOD

(71) Applicant: Accu-Tally, LLC, Magnolia, TX (US)

(72) Inventors: Charles M. Williams, Marietta, OK (US); Lance C. Jordan, Cypress, TX (US); Kevin J. Smith, Magnolia, TX (US); Patrick A. Burns, Jr., Stephenville, TX (US); David Maxfield, Weatherford, TX (US); Phillip Phelps, Fort Worth, TX (US); Dale Benditz, The Woodlands, TX (US)

(73) Assignee: ACCU-TALLY, LLC, Magnolia, TX (US)

( * ) Notice: Subject to any disclaimer, the term of this patent is extended or adjusted under 35 U.S.C. 154(b) by 285 days.

(21) Appl. No.: 15/254,905

(22) Filed: Sep. 1, 2016

(65) Prior Publication Data

US 2018/0058194 A1   Mar. 1, 2018

(51) Int. Cl.
| | |
|---|---|
| *E21B 47/04* | (2012.01) |
| *E21B 47/09* | (2012.01) |
| *G01B 5/10* | (2006.01) |
| *G01D 5/252* | (2006.01) |
| *E21B 47/00* | (2012.01) |

(52) U.S. Cl.
CPC .............. *E21B 47/09* (2013.01); *E21B 47/00* (2013.01); *E21B 47/04* (2013.01); *G01D 5/252* (2013.01)

(58) Field of Classification Search
CPC . G01B 5/10; G01B 5/08; G01B 5/046; G01B 5/043; G01B 3/12; E21B 47/04; E21B 47/09
See application file for complete search history.

(56) References Cited

U.S. PATENT DOCUMENTS

| | | | | |
|---|---|---|---|---|
| 1,982,184 | A | * | 11/1934 | Williams ............... G01B 5/043 33/747 |
| 2,074,524 | A | * | 3/1937 | Uber ....................... E21B 47/04 33/748 |
| 2,806,372 | A | * | 9/1957 | Arps .................... E21B 47/1015 250/260 |
| 2,878,447 | A | * | 3/1959 | Price .................. G01N 27/9093 324/241 |

(Continued)

*Primary Examiner* — Kipp C Wallace
(74) *Attorney, Agent, or Firm* — Patrick K. Steele

(57) ABSTRACT

An apparatus for measuring a profile of a tubular string and the components thereof as the tubular string is made up and run into a borehole. The apparatus includes a rotating assembly disposed within a housing, the rotating assembly including a plurality of upper legs, and plurality of lower legs and a plurality of rolling elements, each upper leg having a proximal end and a distal end coupled to an upper ring, each lower leg having a proximal end coupled to a lower ring and a distal end, and each rolling element rotatably coupled to the proximal end of an upper leg and a distal end of a lower leg. The apparatus further includes a sensor for detecting a position of the rolling elements as they engage an exterior surface of a tubular string being made up and run into a borehole from a rig. The apparatus receives the tubular string through aligned central passages in the upper ring, lower ring and the rotating assembly.

11 Claims, 7 Drawing Sheets

(56) References Cited

U.S. PATENT DOCUMENTS

| | | | | |
|---|---|---|---|---|
| 3,066,254 A * | 11/1962 | Price | ............... | B21B 23/00 |
| | | | | 15/104.04 |
| 3,968,568 A * | 7/1976 | Jackson | ............... | F16L 55/28 |
| | | | | 33/777 |
| 4,205,447 A * | 6/1980 | Smith | ............... | G01B 5/043 |
| | | | | 33/743 |
| 4,466,488 A * | 8/1984 | Nayler | ............... | E21B 19/09 |
| | | | | 166/355 |
| 4,573,359 A * | 3/1986 | Carstensen | ............... | G01L 5/24 |
| | | | | 33/561.2 |
| 5,936,398 A * | 8/1999 | Bellefeuille | ............... | G01B 5/043 |
| | | | | 324/206 |
| 7,377,051 B2 * | 5/2008 | Morris | ............... | E21B 19/22 |
| | | | | 33/734 |
| 7,397,238 B2 * | 7/2008 | Walters | ............... | G01N 27/902 |
| | | | | 324/207.2 |
| 9,441,433 B2 * | 9/2016 | Andersen | ............... | E21B 23/01 |
| 2002/0162240 A1 * | 11/2002 | Lechen | ............... | E21B 47/08 |
| | | | | 33/544 |
| 2005/0194187 A1 * | 9/2005 | Gleitman | ............... | E21B 4/04 |
| | | | | 175/57 |
| 2016/0032711 A1 * | 2/2016 | Sheiretov | ............... | E21B 47/09 |
| | | | | 73/152.54 |

* cited by examiner

APPARATUS FOR MEASURING A TUBULAR STRING AS IT IS LOWERED INTO A BOREHOLE AND METHOD

BACKGROUND

Field of the Invention

The present invention relates to equipment used for oil and gas drilling. More specifically, the present invention relates to a method and equipment for measuring components of a tubular string as it is made up and run into a borehole.

Background of the Related Art

A well may be drilled into the earth's crust for recovery of hydrocarbons, such as oil and gas, from a geologic formation. Various kinds of tubular components are instrumental in constructing and operating a hydrocarbon recovery well. A tubular string is formed by joining tubular segments of a particular type end to end. A borehole is drilled using a drill string comprising tubular drill pipe segments. A bottom-hole assembly (BHA) having a drill bit may be provided at the distal end of the drill string, and the borehole is formed by rotating the drill bit to extend the borehole into the earth's crust. The tubular drill string includes an interior bore that allows drilling fluid to be circulated through the tubular drill string to the distal end of the tubular string to suspend and remove earthen materials from the borehole.

As the borehole is extended and the drill string advances, additional segments of drilling pipe may be assembled into the drill string until the targeted depth and the targeted geologic formation is penetrated. The borehole may be lined with a casing that provides structural integrity to the borehole to prevent collapse. The casing string is cemented into place to isolate penetrated geologic zones one from the others. A production tubing string may be installed to provide a conduit through which fluids can be retrieved to the surface. Like drill strings, casing strings and production strings are also formed by joining segments end to end as they are made up and run into the borehole. Another type of tubular string used in the oil and gas industry is coiled tubing, which is provided on a reel in a long and continuous string, rather than as separate segments joined end to end. Coiled tubing is often used in completion and production operations.

The depth of a borehole and the depth of various tubular components that are included within a tubular string is relevant to completing and operating a well. Some conventional depth measurements are a "driller's depth" and a "logger's depth." Driller's depth is associated with drilling operations and related activities, such as logging while drilling, measurement while drilling, and coring. Driller's depth is typically determined by individually measuring the separate drill string components above ground, before they are connected to the drill string. The individual lengths of components, such as drill pipe segments, drill pipe connectors, and components of the bottom-hole assembly are manually measured and recorded, such as using a measuring tape or laser tool. This manual process is exposed to many opportunities for human error.

A logger's depth may be obtained by tripping wireline equipment downhole, and is generally regarded as a more accurate measurement.

It is advantageous if the operator of a rig can have access to an accurate record of how much length of a tubular string has gone into a borehole, and of the location of the many tubular string components within the tubular string. This information, were it to be available, would enable a rig operator to know, at all times during well operation, the exact location within the borehole of each component of the tubular string. It will be understood that having a readily accessible record of this nature would enable a rig operator to more efficiently run logs, perforate, complete, repair and diagnose a well problem.

BRIEF SUMMARY

A tubular string of the kind used for positioning and/or rotating a drill bit coupled to a leading end of the tubular string, for positioning a tool in a drilled borehole, for casing a drilled borehole to stabilize the borehole, or to serve as a tubular conduit for the injection or production of fluids to or from a geologic formation, may include a plurality of tubular components including, but not limited to, a bottom hole assembly, one or more drill collars, joints of transition pipe, joints of drill pipe, drilling stabilizers, drill collars, a pressurized fluid-powered mud motor, a rotary steerable system, measurement while drilling and/or logging while drilling tools and many other components of many shapes and sizes. A tubular string component often has a characteristic exterior diameter and length, collectively referred to herein as an exterior profile, which differs from the exterior profile of other components of the tubular string.

An operator of a service rig or a drilling rig requires accurate information relating to the tubular string being made up and run into a well to enable precise placement of components of a tubular strings within a borehole or within another tubular string, or to enable access to components disposed within the borehole at known depths. This information can be provided by an apparatus that measures and records the profiles of the various components of the tubular string as it is made up and run into a borehole. This apparatus measures and records not only the profiles of the individual components of the tubular string, but also the spacing of detected features one relative to the others.

One embodiment of the apparatus of the present invention comprises an annular support having a central passage to receive a tubular string therethrough, a lower ring rotatably supported on the annular support and having a central passage to receive the tubular string, the central passage of the lower ring being aligned with the central passage of the annular support. The lower ring may be slidably or, preferably, rollably supported on the annular support using bearings. The embodiment of the apparatus of the present invention further comprises an upper ring having a central passage to receive the tubular string, the central passage of the upper ring being aligned with the central passages in the annular support and in the lower ring. The embodiment of the apparatus further comprises a plurality of lower legs, each lower leg having a first end pivotally coupled to the lower ring and a second end. The embodiment of the apparatus further comprises a corresponding plurality of upper legs, each upper leg having a first end pivotally coupled to the second end of one of the plurality of lower legs and, in embodiments having an upper ring, a second end pivotally coupled to the upper ring. A rotating member is coupled to the second end of each of the plurality of lower legs and to the first end of each of the plurality of upper legs. It will be understood that, in this embodiment, the presence of the upper ring and the plurality of upper legs constrains the movement of each of the plurality of lower legs. That is, each of the plurality of lower legs is mated with one of the plurality of upper legs, and each pairing of upper and lower legs move in unison as the upper ring ascends or descends as the rotating member is radially outwardly displaced or radially inwardly displaced in response to the diameter transitions on the tubular string passing through the central passage of the apparatus. By contrast, embodiments of the apparatus of the present invention having no upper ring and no upper legs may enable each of the lower legs to move independently. The embodiment of the apparatus further comprises a corresponding plurality of rolling elements, each of the rolling elements being rotatably coupled at a center axis to one of the corresponding plurality of pivotal couplings between a second end of one of the plurality of lower legs and a first end of one of the corresponding plurality of upper legs. In one embodiment of the apparatus of the present invention, the plurality of rolling elements, the corresponding plurality of lower legs and the corresponding plurality of upper legs together comprise a rotating assembly. In embodiments having an upper ring, the movement of the upper ring along an axis of the aligned central passages is constrained by the plurality of upper legs pivotally coupled to the upper ring and by the plurality of lower legs pivotally coupled to the upper legs and to the lower ring. The upper ring will rotate with the lower ring and the separation of the upper ring from the lower ring will depend on the angle of the pivotally coupled lower leg and upper leg pairings.

In embodiments having an upper ring, the upper ring is axially movable within a limited range and relative to the lower ring, and relative to the annular support that supports the lower ring, by pivotal movement of the plurality of lower legs and the corresponding plurality of upper legs. The rotating assembly acts as a sensor that detects the diameter of an exterior portion of a component of a tubular string received through the aligned central passages of the lower ring and the upper ring. The rolling element is aligned to engage the exterior surface of the tubular string in alignment with an axis of the tubular string, to roll along the exterior surface of the tubular string as the tubular string is moved into or withdrawn from the borehole and to move radially in response to changes and transitions in the exterior surface of the tubular string. The radial movement of the plurality of rolling elements in response to diametrical transitions in the exterior surface of the tubular string received through the aligned central passages produces pivoting movement of the plurality of upper legs and the plurality of lower legs and radial movement of the plurality of rolling elements results in axial movement of the upper ring relative to the lower ring and relative to an upper ring position sensor disposed proximal to the upper ring.

An embodiment of the apparatus of the present invention may include a plurality of independently operating rotating members. That is, an embodiment of the apparatus may include a plurality of lower legs that are not in a synchronous relationship one with the others. This embodiment of the apparatus of the present invention does not include an upper ring that maintains each of the plurality of lower legs and each of the plurality of rotating members in a synchronous relationship one with the others. In embodiments of the apparatus of the present invention having no upper ring, the plurality of lower legs are pivotally coupled to the lower ring and the plurality of lower legs are spring-biased to engage the rotating member with a tubular string received through the central passage of the apparatus. Embodiments of the apparatus having no upper ring allow each of the lower legs to pivot independently of the other lower legs. This embodiment may include a pivot angle sensor disposed on each of the plurality of lower legs to generate a signal to a processor corresponding to the sensed angle of pivot of the lower leg. It will be understood that a tubular string that is received through the central passage of the apparatus may not be centered within the central passage. As a result of a tubular string being off center within the central passage, a rotating member coupled to the second end of one of the plurality of lower legs may be radially outwardly displaced to a position that is different than the positions of other rotating members that are coupled to the second ends of other lower legs.

In one embodiment of the apparatus of the present invention, the rotation of each of the plurality of rotating members is monitored by a rotation sensor. The rotation sensor generates a signal to a processor, the signal corresponding to sensed rotations of a rotating member. Each rotating member may not rotate at the same rate or through the same number of rotations as other rotating members of the apparatus. Misalignment of the tubular string within the central passage may cause a rotating member on a first lower leg to lose positive engagement with the tubular string while a rotating member on a second, adjacent lower leg may remain in positive engagement with the tubular string. The processor may receive a plurality of signals from the plurality of rotation sensors disposed to monitor the plurality of rotating members. The processor may be programmed to compare the number of rotations and/or the rate of rotation of each of the plurality of rotating members, as indicated by the plurality of signals, occurring during a time interval and to determine which of the rotating members had positive engagement with the tubular string during that time interval. For example, but not by way of limitation, in an embodiment of the apparatus of the present invention having three rotating members and three rotation sensors, each disposed to sense the number of rotations of a rotating member, a processor may compare the three signals corresponding to the sensed rotations of the rotating members and the processor may be programmed to select the signal corresponding to the rotation sensor with the highest number of rotations or with the highest rate of rotation. The selected signal and rotation sensor would then be designated as being the rotating member having the most positive engagement with the tubular string. It will be understood that, generally speaking, the rotating member with the greatest rate of rotation or the greatest number of rotations within a given time interval is the rotating member having the most positive engagement with the tubular string. The processor may continually or intermittently repeat this determination in order to adjust to changes such as the position of the tubular string within the central passage through the apparatus. In this manner, the accuracy of the apparatus in determining the length and profile of the tubular string being run into or removed from a wellbore is increased.

In one embodiment of the apparatus of the present invention, each rolling element includes a first electronically detectable marker and a second electronically detectable marker angularly offset from the first electronically detectable marker so that a sensor disposed proximal to the rolling element will, as the rolling element rotates about its axis in a first direction, detect the first electronically detectable marker and generate a first signal, then the sensor will detect the second electronically detectable marker and generate a second signal. The processor may be programmed with computer program product code enabling the processor to recognize not just the first and second signals, but also to recognize the pause between the second signal and the recurrence of the first signal. It will be understood that if the rolling element rotates about its axis in a second direction that is opposite the first direction, then the processor would receive a second signal followed by a first signal, and then the processor would detect the pause prior to the recurrence of the second signal. This "staggered" pattern of placement of two or more electronically detectable markers can be used to determine not only the length of the tubular string engaged by the rolling element, but also the direction in which the tubular string is moving through the apparatus. Again, the rate of rotation of the plurality of rolling elements, as well as the direction of rotation of the plurality of rolling elements, can be compared to determine which rolling element provides for the most positive engagement with the tubular string.

In one embodiment, each of the plurality of rolling elements includes a periphery that is shaped to promote positive engagement with the tubular string. For example, but not by way of limitation, the periphery of a rolling element may include a portion that is generally parallel to the axis about which the rolling element rotates, a first side at an obtuse angle to the generally parallel portion, and a second side at an equally obtuse angle to the generally parallel portion to form a trough. The trough-shaped periphery of the rolling element may be shaped and sized to engage the tubular string with both the first side and the second side to provide more positive engagement between the rolling element and the tubular string and to prevent slippage that may compromise the measurements taken by the apparatus.

In one embodiment of the apparatus of the present invention, sensors are disposed on the rotating assembly to detect the rate of rotation of one or more of the plurality of rolling elements, the radial position of the rolling elements (an indicator of the diameter of the portion of the tubular string engaged by the plurality of rolling elements) and/or the angle of the upper leg or lower leg that supports each rolling element (another indicator of the diameter of the portion of the tubular string engaged by the plurality of rolling elements) and, optionally, the rate at which the rotating assembly rotates, and the signals generated by sensors on the rotating assembly are communicated wirelessly to a processor that is not on the rotating assembly. In other embodiments of the apparatus of the present invention, the signals may be conductively communicated to the processor using conductive traces on the rotating assembly and conductive brushes that engage the conductive traces as the rotating assembly rotates relative to the brushes. The brushes are themselves conductively coupled to wires that conduct the signals to the processor. These approaches enable the processor to be disposed off the rotating assembly.

In one embodiment of the apparatus of the present invention, each of the plurality of lower legs comprises a second end having a first prong and an adjacent second prong to together form a forked coupling. The forked coupling of the second end of each of the lower legs may further include an aperture in the first prong that is aligned with an aperture in the second prong to receive an axle therethrough. The rotating member may be received on the axle for rotation on the axle between the first and second prongs. Similarly, one embodiments of the apparatus in which the rotating assembly includes a plurality of upper legs, the first end of each of the plurality of upper legs may comprise a first prong and an adjacent second prong. The forked coupling of the first end of the upper leg may further include an aperture in the first prong that is aligned with an aperture in the second prong to receive the axle therethrough. It will be understood that the separation between the first and second prongs of the first end of each of the plurality of upper legs may be sufficient to straddle the first and second prongs of the second end of each of the plurality of lower legs. Alternately, the separation between the first and second prongs of the second end of each of the plurality of lower legs may be sufficient to straddle the first and second prongs of the first end of each of the plurality of upper legs. Either of these alternate arrangements will enable the axis of each of the plurality of rolling elements to be coincident with the pivotal coupling between the second end of each of the plurality of lower legs and the first end of each of the plurality of upper legs.

Embodiments of the apparatus of the present invention may comprise a plurality of sensors including a diameter sensor that senses the position of the rotating members relative to an axis of the aligned central passages through which the tubular string is received. In one embodiment, each diameter sensor includes an angle sensor that senses the angle of the lower leg at the pivotal connection of the first end of the lower leg to the lower ring. It will be understood that the angle of the lower leg at the pivotal connection to the lower ring can be used to determine the diameter of the tubular string received through the central passage of the apparatus if the distance from the axle of the rotating member rotatably connected at the second end of the lower leg to the pivoting coupling at the first end of the lower leg, the diameter of the rotating member, the distance from the pivoting coupling at the first end of the lower leg to the axis of the central passage and the angle of the lower leg between the pivotal coupling at the first end and the axle at the second end of the lower leg are known. Those skilled in the art will understand that a look-up table can be constructed and digitally saved for access by the processor to determine the diameter of the portion of the tubular string contacted by the rotating member that produces the angle sensed by the angle sensor. The combination of the angle sensor and the look-up table, which is developed using the parameters listed above, is the diameter sensor. Alternately, the diameter may be mathematically determined using the same process used to develop the look-up table, that is, the processor may receive a signal from the angle sensor corresponding to the angle of the lower leg produced as a result of the rotating member engaging a portion of the tubular string and, using the known and measured parameters, a diameter of the contacted portion of the tubular string received through the central passage can be determined.

An embodiment of the apparatus of the present invention includes a plurality of rotation sensors, at least one rotation sensor disposed adjacent to each rotating member to sense the number of rotations of the rotating member. The rotation sensors each generate a signal to the processor corresponding to the sensed rotations. The processor can be programmed with the diameter of the rotating members and the diameter of the rotating members can be multiplied by the sensed number of rotations to determine the length of the path traversed by the rotating member as it engages the tubular string. The diameter sensor detects the position of the plurality of rolling elements relative to an axis of the aligned central passages of the annular support, the lower ring and the upper ring through which the tubular strings is received, and generates a signal to a processor corresponding to the sensed position. The sensor may detect the position of the plurality of rolling elements by sensing the position of the upper ring, which varies in a fixed relationship with the position of the plurality of rolling elements. Alternately, the sensor may detect the position of the plurality of rolling elements by sensing the angle of either the plurality of upper legs or the angle of the plurality of lower legs to some fixed structure such as, for example, the axis of the aligned central passages of the annular support, the lower ring and the upper ring.

The rotation sensor detects the number of rotations of one of the plurality of rolling elements that engage the exterior surface of the tubular string and generates a signal to a processor corresponding to the sensed rotations.

It will be understood that the rotating assembly engages the exterior surface of the tubular string with the rolling elements which may be comprised of steel or other common structural materials. In one embodiment, the dynamic responsiveness of the rolling elements can be enhanced by the use of a very lightweight material with a correspondingly low inertia. It will be understood that a rolling element that comprises a very low density material will minimize the amount of force needed to displace the rolling element from a first position to a second position as would occur when at a diameter transition in the tubular string.

In one embodiment of the apparatus of the present invention, the apparatus comprises a housing having a chamber within which the rotating assembly is disposed. The housing may be integral to the annular support on which the lower ring rotates.

DETAILED DESCRIPTION

Figure 1:
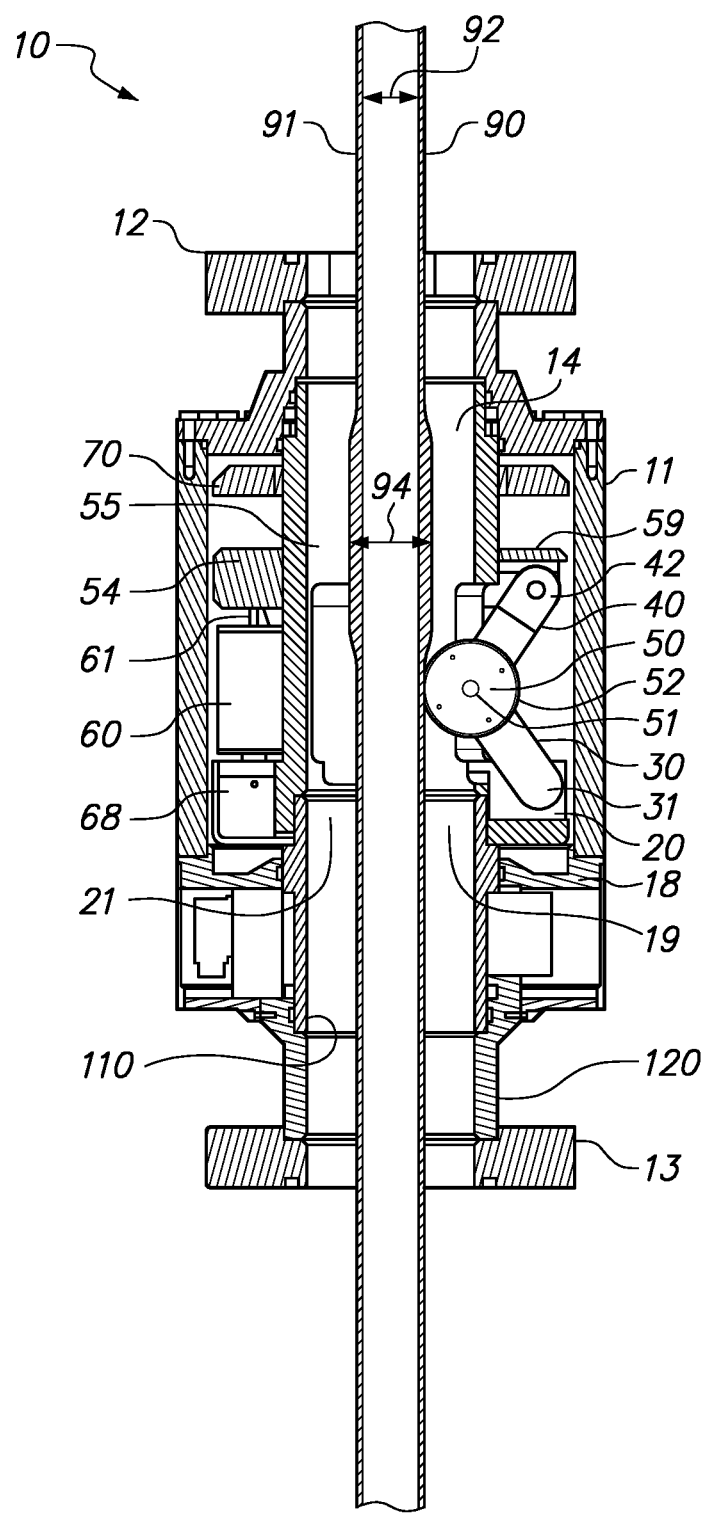
FIG. 1 is a sectional elevation view of an embodiment of an apparatus of the present invention with a tubular string extending therethrough.

FIG. 1 is a sectional elevation view of an embodiment of an apparatus 10 of the present invention with a tubular string 90 having an interior diameter 92 extending therethrough. The apparatus 10 comprises a housing 11 having an upper flange 12 and a lower flange 13, and in interior chamber 14 therebetween. The housing 11 includes an annular support 18 having a central passage 19. A lower ring 20 is rotatably supported on the annular support 18 and includes a central passage 21 that is aligned with the central passage 19 of the annular support 18. An upper ring 54 also includes a central passage 55 that is aligned with the central passages 19 and 21 of the annular support 18 and the lower ring 20, respectively. The apparatus 10 further comprises a plurality of angularly distributed rolling elements 50.

The lower ring 20 is pivotally coupled to a plurality of angularly distributed lower legs 30 at a first end 31 of each of the plurality of lower legs 30, and the upper ring 54 is pivotally coupled to a second end 42 of each of the plurality of upper legs 40. Each of the second ends 32 (not shown in FIG. 1—see FIG. 3) of the plurality of lower legs 30 and each of the first ends 41 (not shown in FIG. 1—see FIG. 3) of the plurality of upper legs 40 are pivotally coupled to an axle 51 of one of the plurality of rolling elements 50. The lower ring 20, the upper ring 54, the plurality of lower legs 30, the plurality of upper legs 40, the plurality of axles 51 and the corresponding plurality of rolling elements 50 together form a rotating assembly 59 that rotates within the interior chamber 14 of the housing 11. The rotating assembly 59 is rotatably supported on the annular support 18.

The tubular string 90 is receivable through the aligned central passages 19, 21 and 55 of the annular support 18, the lower ring 20 and the upper ring 54. The tubular string 90 also passes intermediate the plurality of angularly distributed rolling elements 50 and the plurality of rolling elements 50 are brought to engage an exterior surface 91 of the tubular string 90 at a periphery 52 of each of the plurality of rolling elements 50.

The upper ring 54 is coupled to a displacement sensor 60 by a rod 61. The displacement sensor 60 generates a signal to a transmitter 68 that transmits a signal corresponding to the sensed position of the upper ring 54 to a processor (not shown in FIG. 1) disposed on the rig from which the tubular string 90 is being run. It will be understood that the plurality of rolling elements 50 that engage the exterior surface 91 of the tubular string 90 will be positioned within the housing 11 according to the diameter of a portion of the tubular string 90 that is disposed intermediate the plurality of rolling elements 50, and the position of the upper ring 54 of the rotating assembly 59 within the housing 11 provides an indicator of the diameter of the portion of the tubular string 90 engaged by the periphery 52 of each of the plurality of rolling elements 50. The displacement sensor 60 senses the diameter of the tubular string 90 by sensing the position of the upper ring 54 relative to the housing 11.

The rotating assembly 59 is, as described above, rotatable within the housing 11 of the apparatus 10. The frictional engagement between the periphery 52 of the rolling elements 50 and the exterior surface 92 of the tubular string 90 provides a sufficient rotating moment to the rotating assembly 59 to rotate the rotating assembly 59 at the speed of rotation of the tubular string 90. The mass of the upper ring 54 may contribute to the frictional engagement between the rolling elements 50 and the tubular string 90 by urging the rolling elements 50 radially inwardly into engagement with the exterior surface 92 of the tubular string 90. It will be understood that the upper ring 54 may be weighted and/or sized to promote positive engagement between the rolling elements 50 and the tubular string 90.

Alternately, in some embodiments of the apparatus 10 of the present invention, the upper ring 54 may be spring-biased downwardly to bias the rolling elements 50 into positive rolling engagement with the tubular string 90. In one embodiment of the apparatus 10 of the present invention, a spring-biased upper ring 54 may be adjustably spring-biased so that the force of engagement between the rolling elements 50 and the tubular string 90 can be adjusted for optimal performance.

It will be understood that it may also be advantageous to provide a means of disengaging the rolling elements 50 from the tubular string 90 when, for example, the apparatus 10 of the present invention is being installed, removed or serviced. In one embodiment of the apparatus 10 of the present invention, a fluid cylinder, such as a hydraulic or pneumatic cylinder, can be energized with pressurized fluid to oppose and overcome the mass of the upper ring 54 and/or the force applied by springs that may bias the rolling elements 50 into engagement with the tubular string 90. The fluid cylinders may be used to retract the rolling elements 50 to a withdrawn position by, for example, applying an upwardly displacing force to the upper ring 54.

One embodiment of the apparatus 10 of the present invention includes both a spring element disposed intermediate the housing 11 and the upper ring 54 to bias the rolling elements 50 into engagement with the tubular string 90 and also a fluid cylinder to oppose and, if sufficiently energized, to overcome the force applied by the spring element. It will be understood that in one mode, the fluid cylinders may advantageously be energized to oppose, but to not overcome the force applied by the spring element to the upper ring 54. In this manner, the spring element and the fluid cylinder may be together used to provide a selectable amount of force urging the rolling elements 50 into engagement with the exterior surface 91 of the tubular string 90.

Figure 2:
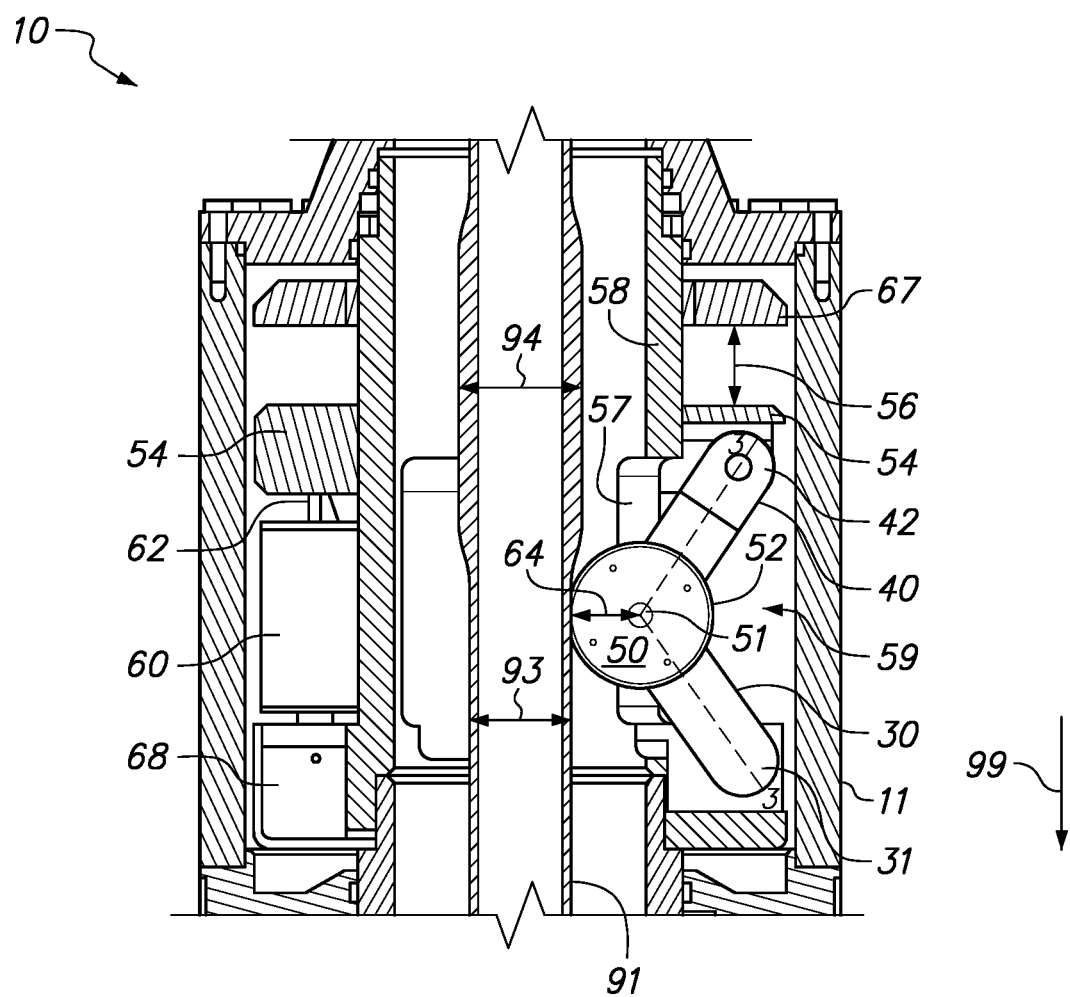
FIG. 2 is an enlarged view of a portion of FIG. 1 illustrating the positions of one of the plurality of rolling elements and the lower leg and upper leg pivotally coupled to the rolling element.

FIG. 2 is an enlarged and sectioned view of a portion of the apparatus 10 of FIG. 1 illustrating the positions of one of the plurality of angularly distributed rolling elements 50 having a diameter indicated by the double-headed arrow 64, one of the plurality of lower legs 30 pivotally coupled to the rolling element 50 and a corresponding one of the plurality of upper legs 40 pivotally coupled to the rolling element 50. The periphery 52 of the rolling element 50 of FIG. 2 is engaged in positive rolling engagement with the exterior surface 91 of the tubular string 90 received through the apparatus 10. The rolling element 50 is engaged with a portion of the tubular string 90 having an exterior diameter indicated by the double-headed arrow 93. The rolling element 50 is provided access to the tubular string 90 through a window 57 within an interior barrier 58 within the housing 11 of the apparatus 10. It will be understood that determining the number of rotations and the position of the plurality of rolling elements 50 as the tubular string 90 is run through the apparatus 10 will provide an accurate measurement of the length and profile of the tubular string 90 given the known diameter of the rolling elements 50 and the position of the rolling elements 50 at locations along the tubular string 90.

The exterior diameter of the tubular string 90 at the double-headed arrow 93 causes the rolling element 50 to be disposed in the position shown, which disposes the lower leg 30 and the upper leg 40 of the rotating assembly 59 at the positions illustrated in FIG. 2. It will be understood that the position of the rotating assembly 59, including the position of the upper ring 54 to which the upper leg 40 is pivotally coupled and the separation distance, indicated by double-headed arrow 56, between the upper ring 54 and an adjacent stop 67 disposed within the housing 11, results from the position of the rolling element 50 that engages the exterior surface 91 of the tubular string 90. The position of the upper ring 54 is detected by the displacement sensor 60 through reciprocatable sensor rod 62. The displacement sensor 60 generates a signal corresponding to the sensed diameter indicated by the double-headed arrow 93 to a transmitter 68 which transmits the signal or a corresponding signal to a processor (not shown) disposed on the rig from which the tubular string 90 is being run.

FIG. 2 illustrates a tubular string 90 having a large diameter portion indicated by the double-headed arrow 94 adjacent to the small diameter portion indicated by the double-headed arrow 93. It will be understood that as the tubular string 90 is advanced in the direction of arrow 99, the large diameter portion of the tubular string 90 indicated by the double-headed arrow 94 will displace the plurality of angularly distributed rolling elements 50 and the rotating assembly 59 to a new position and, as a result, the upper ring 54 will be displaced upwardly to reduce the separation distance indicated by the double-headed arrow 56 between the upper ring 54 and an adjacent stop 67 disposed within the housing 11. This new position of the upper ring 54 will be detected by the displacement sensor 60. The displacement sensor 60 generates a new signal corresponding to the sensed diameter of the portion of the tubular string 90 at the double-headed arrow 94 to the transmitter 68 for transmission to the processor (not shown).

Figure 3:
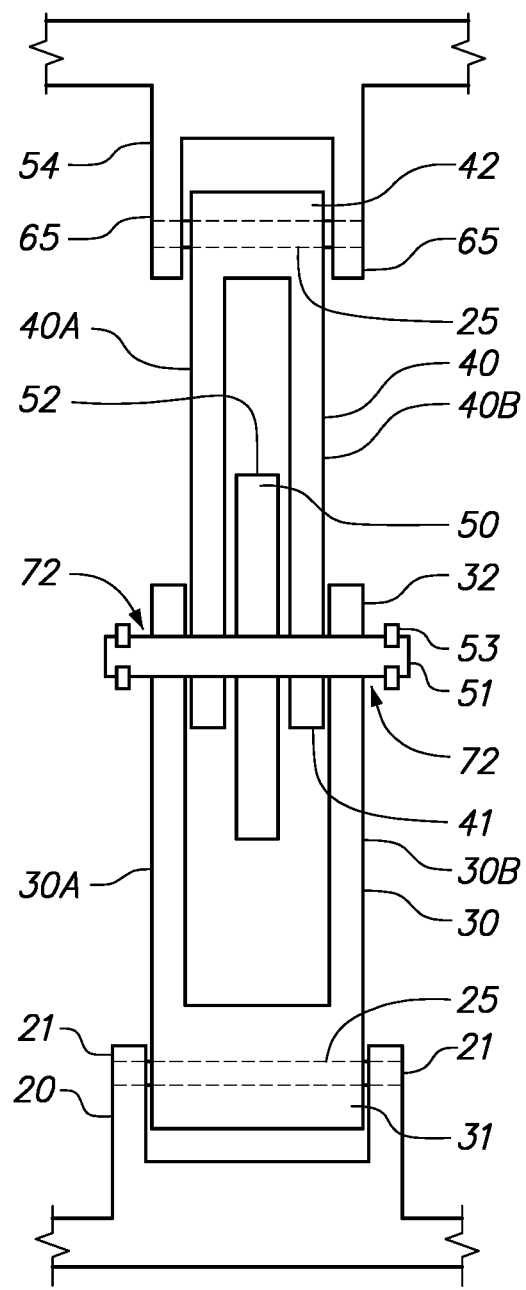
FIG. 3 is the sectional elevation view of FIG. 2 taken along the dotted line indicated by 3-3 as the portion of the tubular string having a diameter indicated by the double-headed arrow is engaged by the rolling element.

FIG. 3 is the sectional elevation view of FIG. 2 taken along the dotted line indicated by 3-3 as the portion of the tubular string 90 having a diameter indicated by the double-headed arrow 93 of FIG. 2 is engaged by the rolling element 50. FIG. 3 reveals the manner in which the second end 32 of each of the plurality of lower legs 30, the first end 41 of each of the plurality of upper legs 40 and one of the plurality of angularly distributed rolling elements 50 are pivotally and rotatably coupled using an axle 51. The second end 32 of the lower leg 30 includes a first prong 30A and a parallel and spaced-apart second prong 30B that together straddle the first end 41 of the corresponding upper leg 40 and the corresponding rolling element 50. The first prong 30A and the spaced-apart second prong 30B of the distal end 32 of the lower leg 30 include aligned apertures 72 to receive the axle 51.

Similarly, the first end 41 of the upper leg 40 includes a first prong 40A and a parallel second prong 40B that together straddle the rolling element 50. The first prong 40A and the second prong 40B of the first end 41 of the upper leg 40 also aligned apertures 72 to receive the axle 51. The axle 51 may receive fasteners 53 such as, for example, straight pins, cotter pins or E-clips, to secure the second end 32 of each lower leg 30, the corresponding first end 41 of each upper leg 40 and the corresponding rolling element 50 on an axle 51.

FIG. 3 also illustrates each of the plurality of lower legs 30 being connected at a first end 31 to the lower ring 20. In the embodiment shown in FIG. 3, the lower ring 20 includes a pair of ears 21 that straddle the first end 31 of each of the plurality of lower legs 30. Each of the plurality of lower legs 30 are pivotally secured at the first end 31 to the pair of ears 21 of the lower ring 20 using a pin 25. Similarly, FIG. 3 illustrates each of the plurality of upper legs 40 being connected at a second end 42 to a pair of ears 65 on the upper ring 54 that straddle the second end 42 of the upper leg 40. The upper leg 40 is pivotally secured at the second end 42 to the upper ring 54 using a pin 25. The pin 51 pivotally secures the second end 32 of each of the plurality of lower legs 30 to the first end 41 of a corresponding upper leg 40.

Figure 4:
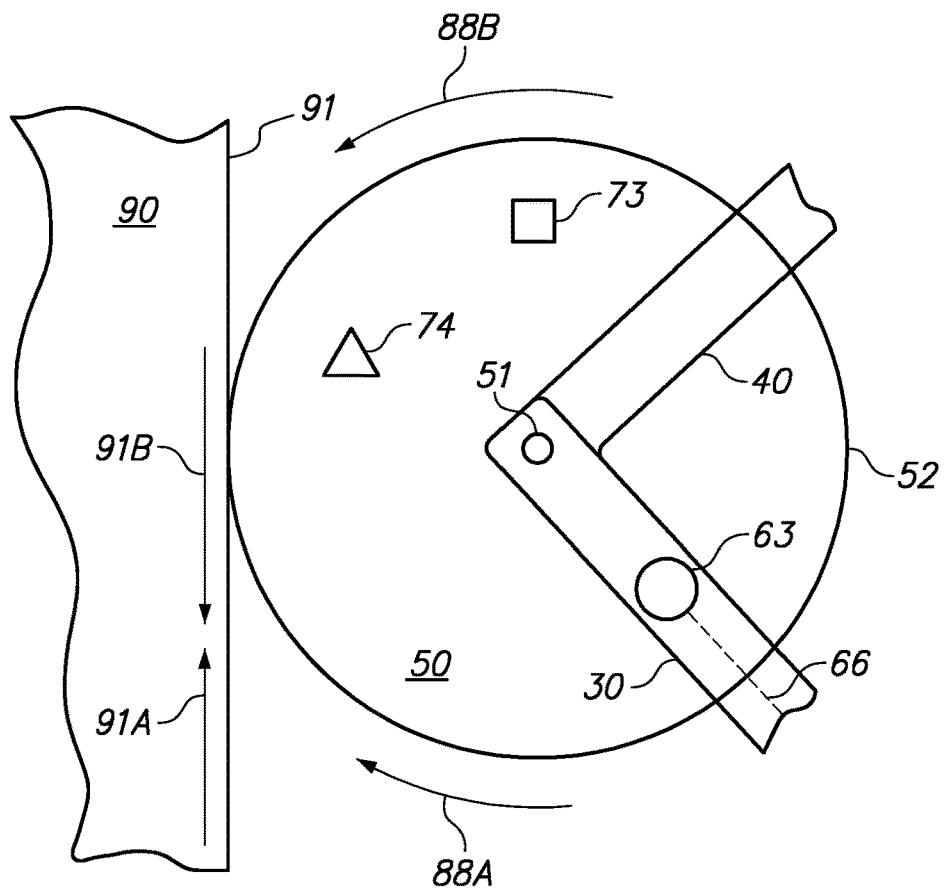
FIG. 4 is a sectional side view of a rolling element rollably engaging a tubular string moving in a vertical plane relative to the rolling element.

FIG. 4 is a sectional side view of one of the plurality of rolling elements 50 of the apparatus 10 of FIGS. 1-3 rollably engaging an exterior surface 91 of a tubular string 90 moving in a vertical plane relative to the plurality of rolling elements 50. The rolling element 50 of FIG. 4 is supported an its axle 51 which is, in turn, movably supported by one of the plurality of lower legs 30 and a corresponding upper leg 40. FIG. 4 illustrates a rolling element sensor 63 disposed on the lower leg 30 at a position proximal to the circular path (not shown) that will be followed by a first electronically detectable marker 73 and a second electronically detectable marker 74 disposed on the rolling element 50 at angularly separated positions. It will be understood that the first electronically detectable marker 73 and a second electronically detectable marker 74 will follow a circular pathway bringing each of the first electronically detectable marker 73 and a second electronically detectable marker 74 proximal to the rolling element sensor 63 on the lower leg 30 as the rolling element 50 rotates about its axle 51. It will be understood that the angular separation between the first electronically detectable marker 73 and a second electronically detectable marker 74 makes the two markers angularly "staggered" with respect to the rolling element sensor 63 and that the signals detected by the rolling element sensor 63 upon passage of the first electronically detectable marker 73 and the second electronically detectable marker 74 will not be simultaneous. Instead, the signals generated by the first electronically detectable marker 73 and the second electronically detectable marker 74 coming into close proximity to the sensor 63 will be received one before the other, if the rolling element is rotating in a first direction and one after the other if the rolling element is rotating in a second direction. More specifically, if the tubular string 90 is moving in the direction of arrow 91A (upwardly in FIG. 4), the rolling element 50 will rotate in the direction of arrow 88A and the signal of the first electronically detectable marker 73 will be detected first and the signal of the second electronically detectable marker 74 will be detected second. The detection of these two signals, in that order, will then be followed by a prolonged pause as the first electronically detectable marker 73 moves around the axle 51 and finally returns on its circular path to a position proximal to the rolling element sensor 63. Alternately, if the tubular string 90 is moving in the direction of arrow 91B (downwardly in FIG. 4), the rolling element 50 will rotate in the direction of arrow 88B and the signal of the second electronically detectable marker 74 will be detected first and the signal of the first electronically detectable marker 73 will be detected second. The detection of these two signals, in that order, will then be followed by a prolonged pause as the second electronically detectable marker 74 moves around the axle 51 and finally returns on its circular path to a position proximal to the rolling element sensor 63. It will be understood that computer program product code can be written and implemented using a processor (not shown) to receive and interpret these patterns and to thereby determine not only the rate of rotation of the rolling element 50, and the corresponding rate of ascent or descent of the tubular string 90, but also the direction of rotation of the rolling element 50 based on the repeating pattern of signals generated by the rolling element sensor 63. The signals generated by the rolling element sensor 63 can be conveyed to a processor (not shown) through conductive wire 66 connected to the sensor 63. The conductive wire 66 is but one of the signal-carrying conductive wires that deliver signals to the processor (not shown).

It will be understood that there may be additional electronically detectable markers disposed on the rolling element 50 to generate a signal each time the additional markers move near the rolling element sensor 63, and a variety of patterns of signals may be generated and interpreted using computer program product code run using a processor.

Figure 5:
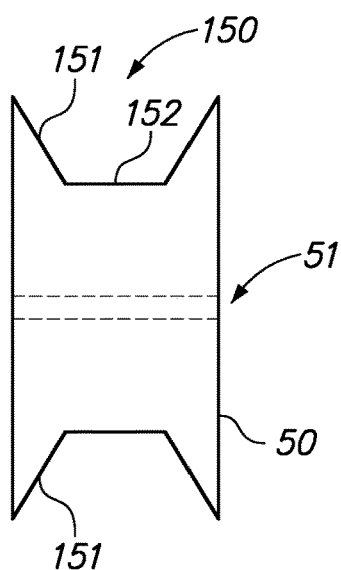
FIG. 5 is an illustration of the shaped periphery of an embodiment of a rolling element adapted for non-slip engagement with the tubular string (not shown).

FIG. 5 is an illustration of the shaped periphery 151 of an embodiment of a rolling element 50 adapted for non-slip engagement with the tubular string (not shown). The shaped periphery 151 includes a pair of sides 151, each forming an obtuse angle with a bottom 152 of the shaped periphery 151 of the rolling element 50. The rolling element 50 rotates about its axle 51 as the shaped periphery 151 engages the tubular string 90 (not shown) along both sides 151 thereby providing superior non-slip engagement between the rolling element 50 and the tubular string 90 (not shown) for improved accuracy of the apparatus.

Returning briefly to FIG. 1, it will be seen that the rotating assembly 59 of the embodiment of the apparatus 10 includes a rotating sleeve 110 rotatably disposed proximal to a non-rotating support portion 120 adjacent to a lower flange 13. The rotating sleeve 110 may be used to conduct signals generated by sensors including, but not limited to, the sensors 73 and 74 on the rolling element 50 depicted in FIG. 3, and the displacement sensor 60 shown in FIG. 1, to a processor (not shown).

Figure 6:
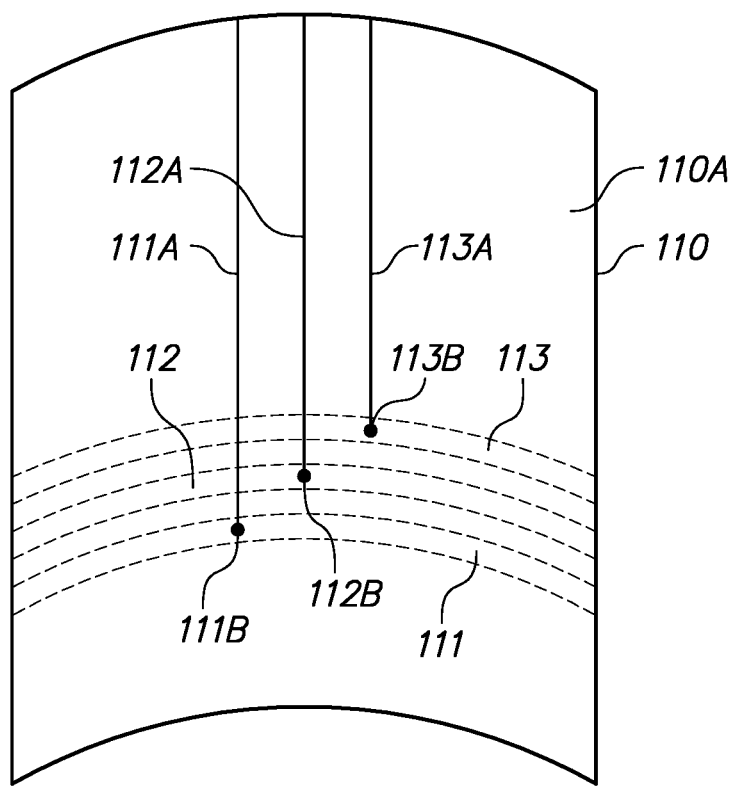
FIG. 6 is an interior view of a portion of the rotating assembly illustrating how a plurality of parallel vertical conductive traces can be used to conduct signals from a plurality of sensors (not shown) on the rotating assembly to circumferential and parallel conductive exterior traces (shown in dotted lines).

FIG. 6 is an interior view of a portion of the generally cylindrical rotating sleeve 110 of the rotating assembly 59 of the apparatus 10 illustrating how a plurality of parallel vertical conductive traces 111A, 112A and 113A can be used to conduct signals from a plurality of sensors (not shown in FIG. 6) on the rotating assembly 59 (not shown) to circumferential and parallel conductive exterior traces 111, 112 and 113 (shown on FIG. 6 in dotted lines). Conductive trace 111A terminates at a junction 111B which is a radial penetration that conducts signals from conductive trace 111A on the interior side 110A of the sleeve portion 110 to exterior trace 111. Similarly, conductive trace 112A terminates at a junction 112B which is a radial penetration that conducts signals from conductive trace 112A on the interior side 110A of the sleeve portion 110 of the rotating assembly 59 to exterior trace 112, and conductive trace 113A terminates at a junction 113B which is a radial penetration that conducts signals from conductive trace 113A on the interior side 110A of the sleeve portion 110 to exterior trace 113. It will be understood that although FIG. 6 illustrates a sleeve portion 110 of an embodiment of the apparatus 10 of the present invention in which the sleeve portion 110 includes three vertical conductive traces 111A, 112A and 113A, three penetrating junctions 111B, 112B and 113B, and three corresponding conductive exterior traces 111, 112 and 113, other embodiments may include more vertical conductive traces and conductive exterior traces or fewer vertical conductive traces and conductive exterior traces. It will be further understood that by using electronically detectable markers that generate a distinctive signal that indicates and identifies the specific electronically detectable marker from which the signal originates, fewer conductive traces (vertical or exterior) will be required because the processor can determine the marker from which a received signal originates from the signal content. FIG. 6 merely illustrates an example of how such signals may be conductively delivered to a processor (not shown).

Figure 7:
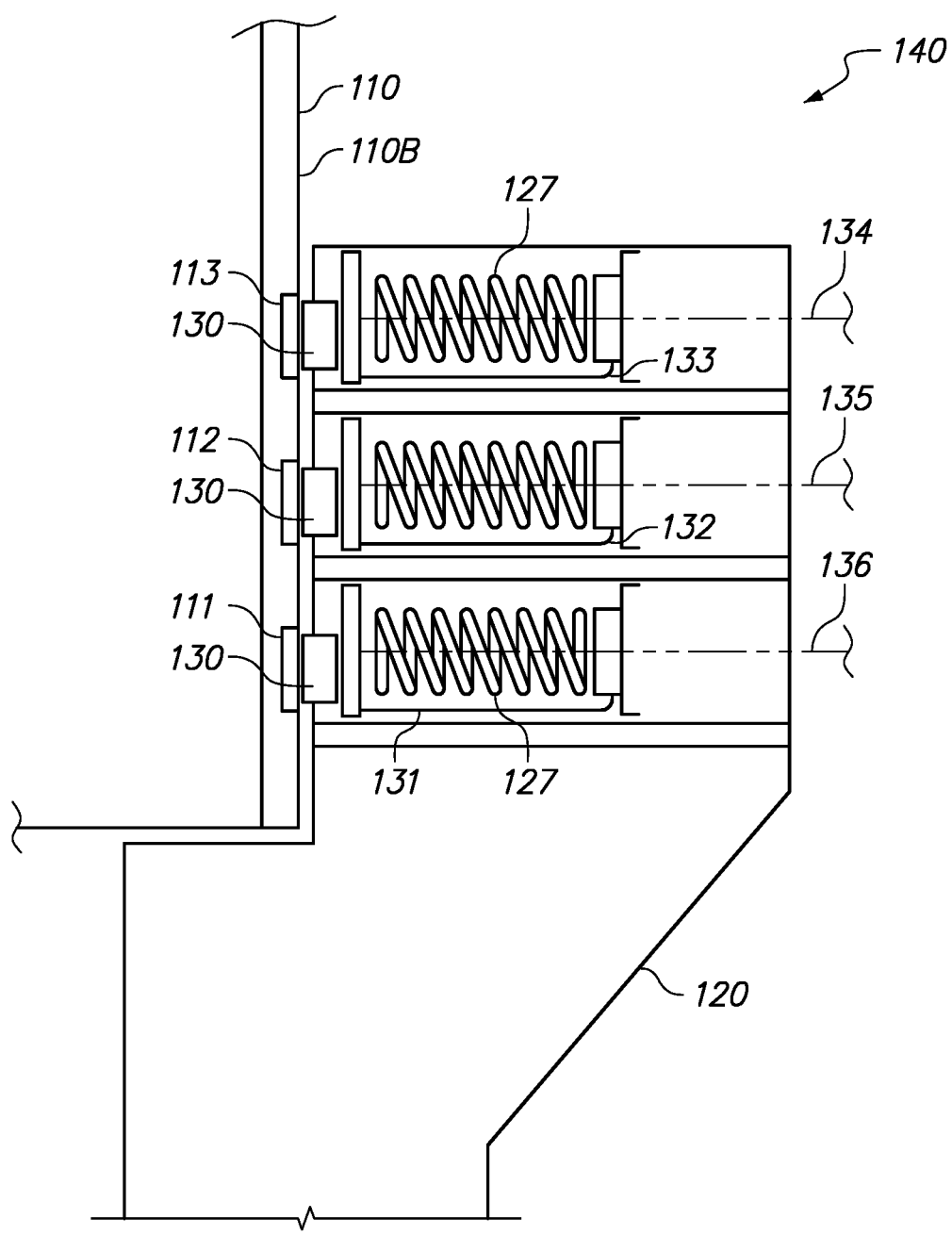
FIG. 7 is an elevation view of a plurality of spring-loaded brush elements disposed on a non-rotating portion of the apparatus to conductively engage the parallel exterior traces illustrated in FIG. 6 to conduct signals from the parallel exterior traces to a processor (not shown).

FIG. 7 is an elevation view of a plurality of a spring-loaded brush assembly 140 disposed on a non-rotating portion 120 of the apparatus 10 to conductively engage the parallel exterior traces 111, 112 and 113 on the exterior 110B of the rotating sleeve 110 of the rotating assembly 59 of FIG. 1 and to conduct signals from the exterior traces 111, 112 and 113 to a processor (not shown). Each brush element 130 is spring-biased to conductively engage one of the adjacent exterior traces 111, 112 and 113 on the rotating sleeve 110 and to conduct signals from the engaged exterior traces 111, 112 and 113 through the plurality of brush elements 130 to signal pickups 131, 132 and 133 that deliver the signals to a conductive wires 134, 135 or 136, respectively. The biasing of the springs 127 maintains positive conductive engagement between the plurality of brush elements 130 and the respective engaged exterior traces 111, 112 and 113. It will be understood that although FIG. 7 illustrates an embodiment of the apparatus 10 of the present invention having a spring-loaded brush assembly 140 that includes three brush elements 130, other embodiments may include more brush elements 130 or fewer brush elements 130. It will be further understood that by using electronically detectable markers that generate a distinctive signal that indicates and identifies the specific electronically detectable marker from which the signal originates, fewer brush elements 130 will be required because the processor can determine the marker from which the signal originates from the signal content.

It will be understood that the rolling element sensor 63 in FIG. 4 may generate and deliver a signal to conductive wire 66 connected thereto, and the signal may be transmitted through conductive wire 66 to conductive trace 111A in FIG. 6. The signal may be conducted by conductive trace 111A to junction 111B and on to exterior trace 111 shown in FIG. 7. The signal may, for example, but not by way of limitation, be conducted from exterior trace 111 through brush element 130 to signal pickup 133 in FIG. 7 and from signal pick-up 131 to conductive wire 136, which conducts the signal to the processor 150 (not shown in FIG. 7—see FIG. 8). Similarly, displacement sensor 60 in FIG. 1 may generate and deliver a signal to a conductive wire (not shown) connected thereto, and the signal may be transmitted through the conductive wire to conductive trace 112A in FIG. 6. The signal may be conducted by conductive trace 112A to junction 112B and on to exterior trace 112. The signal may be conducted from exterior trace 112 through a brush element 130 to signal pickup 132 in FIG. 7 and from signal pick-up 132 to conductive wire 135, which conducts the signal to the processor 150 (see FIG. 8). It will be understood that other additional sensors such as, for example, other rolling element sensors disposed on other rolling elements may also be disposed on the rotating assembly 59 to generate and deliver signals to the processor 150 in the same manner. It will be further understood that the apparatus 10 may include more sensors than the three signals indicated by FIGS. 6 and 7, and that the drawings appended hereto are for illustration purposes, not to limit the number of signal-generating sensors on the rotating assembly 59.

Figure 8:
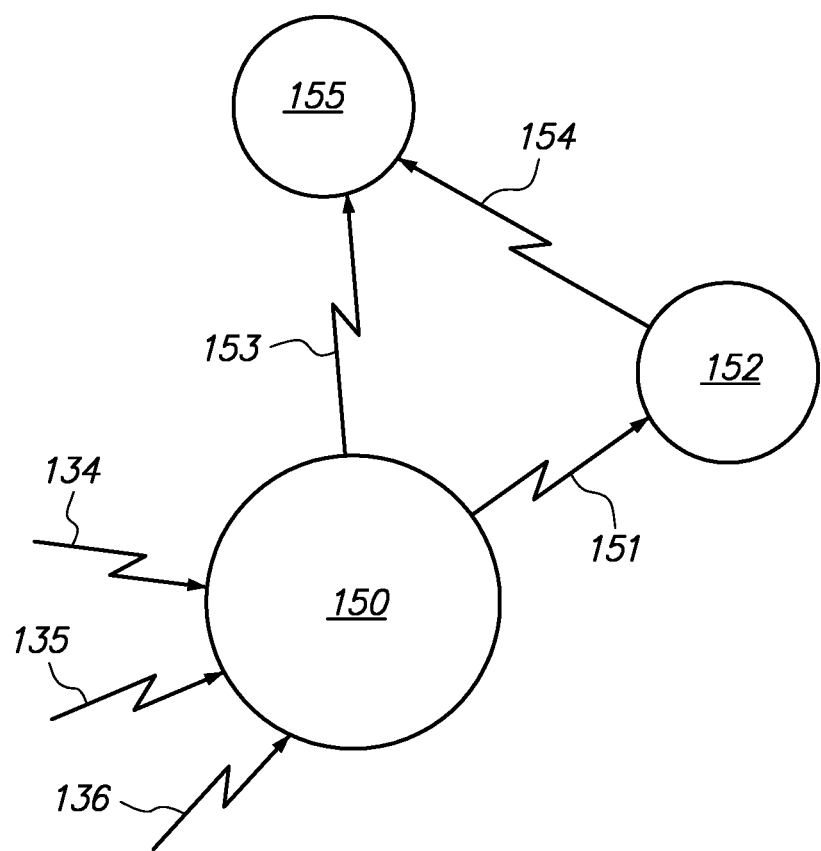
FIG. 8 is an illustration of the interaction between the spring-loaded brush pick-ups of FIG. 7, a processor, and a data storage device.

FIG. 8 is an illustration of the interaction between the conducive wires 134, 135 and 136 of FIG. 7, a processor 150, and a data storage device 152 and an optional display device 155. The conductive wires 134, 135 and 136 of FIG. 7 carry signals from the brush pick-ups and/or the displacement sensor 60. It will be understood that the purpose of the drawings appended hereto is to illustrate the components of an embodiment of the apparatus of the present invention, not to limit the number of conductive traces, data signal pick-ups, spring-loaded brush elements, etc. The processor 150 can be used to store data received via the conductive wires 134, 135 and 136 by generating a signal 151 delivered to the storage device 152 and, optionally, to display a "map" or image reflecting the measurements indicated by the signals stored on the storage device 152 and received by the processor 150.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   a housing having an upper end, a lower end for connecting to a blow-out preventer, and a central passage through the housing that is alignable with a central passage through a blow-out preventer that is connected to the lower end of the housing;
   an annular support having a central passage coupled to and supported within the housing in a position to align the central passage of the annular support with the central passage of the housing;
   a lower ring rotatably supported on the annular support, the lower ring having a central passage aligned with the central passages of the annular support and the housing;
   a plurality of lower legs, each having a proximal end pivotally coupled to the lower ring and a distal end;
   a plurality of upper legs, each having a proximal end, pivotally coupled to the distal end of one of the plurality of lower legs, and a distal end;
   an upper ring having a central passage aligned with the central passage of the housing, the upper ring being pivotally coupled to the distal ends of the plurality of upper legs, the upper ring being axially movable within a limited range relative to the annular support;
   a plurality of rolling elements rotatably coupled to the proximal ends of the plurality of upper legs and rotatably coupled to the distal ends of the plurality of lower legs, each of the plurality of rolling elements having an axis of rotation that lies in a plane that is perpendicular to an axis of the aligned central passages; and
   a sensor coupled to detect the position of the plurality of rolling elements relative to the central passage and to communicate a signal corresponding to the detected position of the plurality of rolling elements to a transmitter;

wherein the weight of the upper ring biases the rolling elements into engagement with the tubular string received through the aligned central passages.

2. The apparatus of claim 1, further comprising:
a spring element disposed intermediate the housing and the upper ring to bias the upper ring in a downwardly direction and to bias the plurality of rolling elements connected to the proximal ends of the plurality of upper legs radially inwardly to engage the tubular string.

3. The apparatus of claim 1, further comprising: a fluid cylinder activatable to retract the plurality of rolling elements radially outwardly away from engagement with the tubular string.

4. The apparatus of claim 3, wherein the fluid cylinder is one of pneumatic and hydraulic.

5. The apparatus of claim 1, wherein the transmitter generates a wireless signal that can be detected using a receiver.

6. An apparatus, comprising:
a housing having a central passage;
a support having a central passage aligned with the central passage of the housing;
a lower ring rotatably supported on the support, the lower ring having a central passage aligned with the central passage of the support;
an upper ring having a central passage aligned with the central passage of the support;
a plurality of lower legs, each having a proximal end pivotally coupled to the lower ring and a distal end;
a plurality of upper legs, each having a distal end pivotally coupled to the upper ring and a proximal end;
a plurality of rolling elements, each coupled to a distal end of one of the plurality of lower legs and to a proximal end of one of the plurality of upper legs; and
a plurality of rolling element sensors, each rolling element sensor disposed to detect rotations of one of the plurality of rolling elements and to generate a signal corresponding to the rotations.

7. The apparatus of claim 6, further comprising:
a displacement sensor disposed to detect the displacement of the upper ring relative to the housing.

8. The apparatus of claim 6, further comprising:
a processor for receiving signals generated by the plurality of rolling element sensors.

9. The apparatus of claim 7, further comprising:
a processor for receiving signals generated by the plurality of rolling element sensors.

10. The apparatus of claim 6, further comprising:
a set of brushes coupled to the housing, each brush biased to engage a conductive trace on a rotating assembly of the apparatus to enable signals generated by sensors on the rotating assembly of the apparatus to be conducted to the brushes for being conducted further to a processor.

11. The apparatus of claim 6, further comprising:
a plurality of angle sensors, each disposed proximal to one of the plurality of lower legs to detect the angle of the lower leg and to generate a signal corresponding to the detected angle.

* * * * *